S. W. WICKES.
Modes of Lubricating Pistons in Rotary Steam-Engines.

No. 141,845.              Patented August 12, 1873.

Witnesses:              Inventor:
Horace Silsby           Sterling W. Wickes
Geo. W. Mead          by Chas. T. Silsby
                                       his Attorney

UNITED STATES PATENT OFFICE.

STERLING W. WICKES, OF SENECA FALLS, NEW YORK, ASSIGNOR TO H. C. SILSBY, OF SAME PLACE.

IMPROVEMENT IN THE MODES OF LUBRICATING PISTONS IN ROTARY STEAM-ENGINES.

Specification forming part of Letters Patent No. 141,845, dated August 12, 1873; application filed June 19, 1873.

*To all whom it may concern:*

Be it known that I, STERLING W. WICKES, of Seneca Falls, in the State of New York, have invented an Improvement in Rotary Engines, of which the following is a specification:

My invention relates to the method of oiling the cams or pistons of rotary steam-engines by applying the oil directly to the sides of the cams, thereby preventing the escape of the oil with the exhaust steam, enabling the engine to be packed tighter, and thus preventing a waste of steam.

The following is a description of my invention, reference being had to the accompanying drawings.

Figure 1:
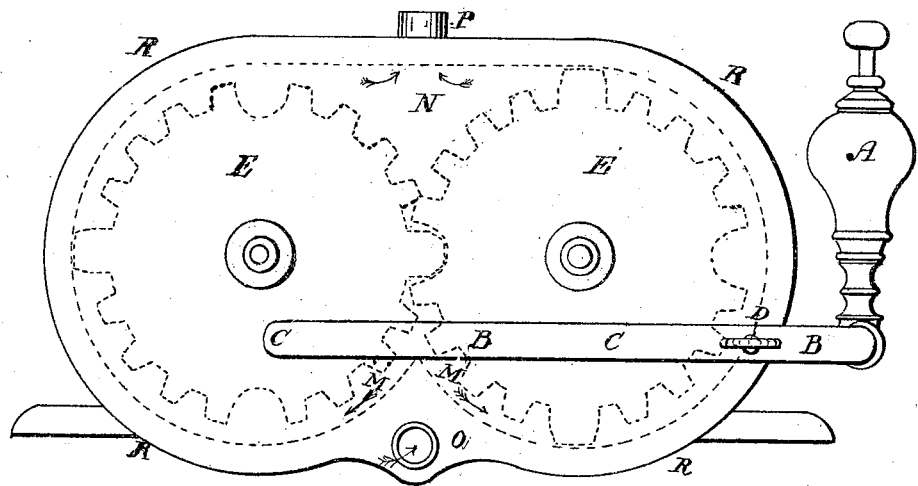
Figure 2:
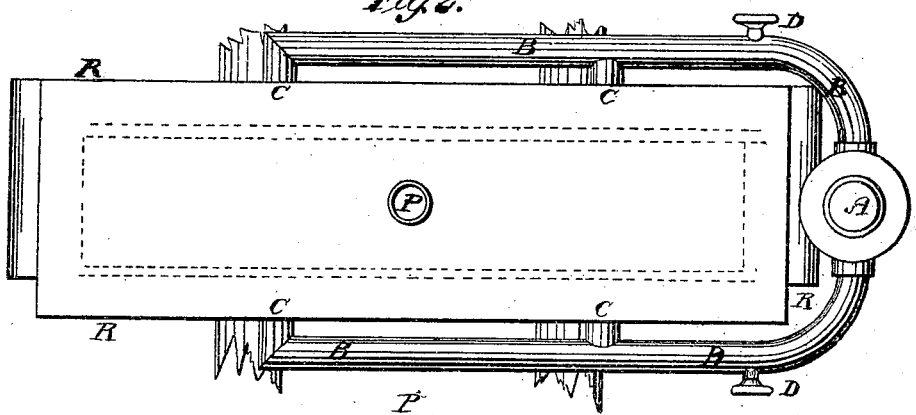
Figure 3:
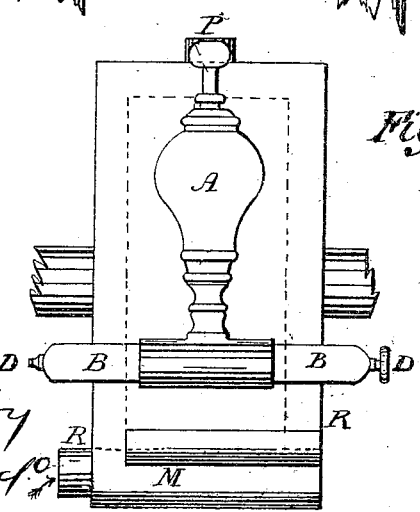

Figure 1 is a side view of my invention, of which R R R is the case and E E the cams of a rotary steam-engine. M is the steam-chamber and N the exhaust-chamber. Fig. 2 is a top view of the same, and Fig. 3 is a view of that end of the machine which is at the left hand in Figs. 1 and 2.

In Fig. 1, A is an oil-pump, and B B the pipe through which the oil is conducted to the openings C C, where it enters the case and is forced directly against the sides of the cams. D is a stop-cock, the use of which will be hereafter explained. The opposite side of the machine is constructed in the same manner, as shown in Figs. 2 and 3.

Formerly the oil was introduced, with the live steam, at O, following the direction of the steam, as shown by the arrows, and was wasted in large quantities by passing out with the exhaust steam at P, a small quantity only reaching the sides of the cams, where it is most needed.

In my invention the oil is forced, by means of the pump A, into the horizontal pipes B B, and, by means of the openings C C, is brought into direct contact with the sides of the cams, and by their rotary motion is equally distributed over the entire surface of the said cams. The oil is forced through all four of the openings C by one stroke of the pump A.

Atmospheric oil-cups or oil-boxes may be substituted for the pump A and the pipes B B. Should one side of the engine require more oil than the other, the additional quantity may be supplied by turning off (either wholly or partially) the stop-cock D on that side needing the least oil and leaving the other open.

I claim as my invention—

1. The oil-pump A, the horizontal pipes B B, with the openings C C, when the several parts are combined in rotary steam-engines, substantially as and for the purposes hereinbefore described.

2. The combination, in rotary steam-engines, of the pipes B B and the stop-cocks D D, substantially as and for the purposes hereinbefore specified.

STERLING W. WICKES.

Witnesses:
WM. K. MILLER,
BURT SILSBY.